US008620927B2

(12) United States Patent
Jonas

(10) Patent No.: US 8,620,927 B2
(45) Date of Patent: Dec. 31, 2013

(54) UNGUIDED CURIOSITY IN SUPPORT OF ENTITY RESOLUTION TECHNIQUES

(75) Inventor: Jeffrey J. Jonas, Las Vegas, NV (US)

(73) Assignee: International Business Machines Corporation, Armonk, NY (US)

( * ) Notice: Subject to any disclaimer, the term of this patent is extended or adjusted under 35 U.S.C. 154(b) by 345 days.

(21) Appl. No.: 12/825,331

(22) Filed: Jun. 28, 2010

(65) Prior Publication Data
US 2011/0317926 A1 Dec. 29, 2011

(51) Int. Cl.
G06F 7/00 (2006.01)
(52) U.S. Cl.
USPC .......... 707/748; 700/749; 700/752; 700/754; 700/770; 700/776
(58) Field of Classification Search
None
See application file for complete search history.

(56) References Cited

U.S. PATENT DOCUMENTS

| 6,968,348 | B1 * | 11/2005 | Carone et al. ............. 707/696 |
| 7,376,680 | B1 * | 5/2008 | Kettler et al. ................ 1/1 |
| 7,657,540 | B1 * | 2/2010 | Bayliss .................. 707/999.1 |
| 7,685,201 | B2 | 3/2010 | Zeng et al. |
| 8,041,712 | B2 * | 10/2011 | Baris et al. ................. 707/723 |
| 2007/0061872 | A1 | 3/2007 | Carter |
| 2008/0172721 | A1 | 7/2008 | Noh et al. |
| 2008/0177691 | A1 | 7/2008 | Alperovitch et al. |
| 2008/0222064 | A1 | 9/2008 | Larimer |
| 2008/0301788 | A1 | 12/2008 | Yoakum |
| 2009/0193520 | A1 | 7/2009 | Buss |
| 2009/0210930 | A1 | 8/2009 | Lexcellent et al. |
| 2009/0228294 | A1 | 9/2009 | Choi et al. |
| 2010/0005346 | A1 * | 1/2010 | Hamlescher et al. ........... 714/57 |
| 2010/0280955 | A1 * | 11/2010 | Ross et al. ...................... 705/64 |

FOREIGN PATENT DOCUMENTS

| WO | 2009046758 | 4/2009 |
| WO | 2009065428 | 5/2009 |

OTHER PUBLICATIONS

HITSP, "HITSP: Entity Identity Assertion Component", Healthcare Information Technology Standards Panel, Release for Implementation, Version 1.2, Aug. 27, 2008, 19 pp.
Jonas, J., "Jeff Jonas: Entity Resolution Systems Vs. Match Merge/Merge Purge/List De-duplication Systems", [online], Sep. 25, 2007 [Retrieved on Nov. 20, 2009], retrieved from the Internet at <URL: http://jeffjonas.typepad.com/jeff_jonas/2007/09/entity-resoluti. html>, 5 pp.
Jonas, J., "Jeff Jonas: Smart Systems Flip-Flop", [online], Jun. 11, 2008 [Retrieved on Dec. 30, 2009], retrieved from the Internet at <URL: http://jeffjonas.typepad.com/jeff_jonas/2008/06/smart-systems-f.html>, Total 4 pp.
Jonas, J., "Threat and Fraud Intelligence, Las Vegas Style", IEEE Security and Privacy, Nov./Dec. 2006, 8 pp.

(Continued)

*Primary Examiner* — Anh Tai Tran
(74) *Attorney, Agent, or Firm* — Janaki K. Davda; Konrad, Raynes, Davda & Victor LLP

(57) ABSTRACT

Provided are techniques for receiving data comprising an entity having at least one feature; determining how the entity correlates with an existing entity, identifying an additional feature to increase confidence of the entity resolution, searching a data source for the additional feature to obtain an observation containing the additional feature, and performing the entity resolution using the at least one feature and the additional feature.

24 Claims, 13 Drawing Sheets

(56) References Cited

OTHER PUBLICATIONS

Lilien, L. and B. Bhargava, "A Scheme for Batch Verification of Integrity Assertions in a Database System", IEEE Transactions on Software Engineering, vol. 10, No. 6, Nov. 1984, 17 pp.

Pearl, J., "On Summarizing Data Using Probabilistic Assertions", IEEE Transactions on Information Theory, vol. 23, No. 4, Jul. 1977, 7 pp.

\* cited by examiner

| JOB APPLICANT | ARREST RECORD |
|---|---|
| Mark Smith | Mark K. Smith |
| 557-57-3062 | 123 Main Street, LV |
| 6/22/64 | 6/22/64 |

FIG. 4

| FEATURE NEEDED | WHERE TO SEARCH |
|---|---|
| Address | Data Source 1 |
| | Data Source 2 |
| | Data Source 3 |
| | Data Source 4 |
| Name | Data Source 1 |
| | Data Source 2 |
| | Data Source 3 |
| | Data Source 4 |

FIG. 6

| WHERE TO SEARCH | WHAT IS NEEDED TO SEARCH |
| --- | --- |
| Data Source 1 | Name |
| | Phone Number |
| | Address |
| Data Source 2 | Phone Number |
| | Address |
| | Name and Year of Birth |
| Data Source 3 | IP Address |
| | Email Address |
| | Phone Number |
| Data Source 4 | Name and Date of Birth (DOB) |
| | Name and Last 4 digits of SSN |
| | Name and Address |
| Felon Data Source | Name and DOB |
| | Name and Address |
| | Address |
| | Name and State |

FIG. 7

| WHERE TO SEARCH | COST | ACCURACY | TECHNIQUE |
|---|---|---|---|
| Data Source 1 | $0 | 2 | Auto |
| Data Source 2 | $0 | 3 | Auto |
| Data Source 3 | $00.22 | 5 | Interface |
| Data Source 4 | $5.00 | 7 | Interface |
| Felon Data Source | $0 | 9 | Auto |

| RECORD IDENTIFIER | ENTITY IDENTIFIER | APPLICANTS ON FILE | ADDRESS | YEAR OF BIRTH |
|---|---|---|---|---|
| 101 | 1 | Mary Jones | 321 Foster Blvd, CA | 1976 |
| 102 | 2 | Tim Varnully | PO Box 99870, NB | 1943 |
| 103 | 3 | Jan Wadaman | 4405 Fist Ave, Suite 10, TX | 1982 |
| 104 | 4 | Jeffrey Smothers | 2110 Factory Lane, OR | |

FIG. 11

UNGUIDED CURIOSITY IN SUPPORT OF ENTITY RESOLUTION TECHNIQUES

BACKGROUND

1. Field

Embodiments of the invention relate to unguided curiosity in support of entity resolution techniques.

2. Description of the Related Art

The terms, identity resolution, entity resolution, semantic reconciliation generally refer to the same type of technique (e.g., algorithm). More specifically, such techniques frequently use either probabilistic or deterministic techniques or some combination of both to determine with a degree of confidence whether the entities (e.g., persons, places or things) are the same or not. This decision is an entity resolution "assertion."

For example, a first record containing CustID#1 [Bob Jones at 123 Main Street with a Date of Birth (DOB) of Jun. 21, 1945] is likely to represent the same entity as a second record containing CustID#2 [Bob K Jones at 123 S. Main Street with a DOB of Jun. 21, 1945]. Entity resolution can be used within a single data source to find duplicates, across data sources to determine how disparate transactions (also referred to herein as records) relate to one entity, or used both within and across a plurality of data sources at the same time.

Entities have features (values that are collected or observed that can be more or less discriminating). For example, in the area of human entities, features may include one or more of: name, address, phone, DOB, Social Security Number (SSN), Driver's License (D/L), biometric features, gender, hair color, and including, but not limited to geospatial temporal attributes, familial or other relationships, patterns of life (like ones movement over the course of a day). By way of example, SSN's are generally very discriminating, dates of birth are less discriminating, and gender is not particularly discriminating at all. As another example, entity resolution on objects, such as a car, may include one or more features of: license plate number, Vehicle Identification Number (VIN), make, model, year, color, owner, and so on.

Features may be used to establish confidence (a degree of certainty that two discreetly described entities are the same). For the above example of CustID#1 and CustID#2, the confirming features of name, address, and DOB and the lack of conflicting features (e.g., features in disagreement, such as a SSN number of 111-11-1111 versus 33-44-5555) probably result in a high enough confidence to assert that the first record and the second record represent the same entity (e.g., person), without human review.

Entity resolution is sometimes referred to by other names e.g., deduplication, match/merge, and so on. Entity resolution systems are described further in: "Entity Resolution Systems vs. Match Merge/Merge Purge/List De-duplication Systems" by Jeff Jonas, published Sep. 25, 2007. Some entity resolution assertion systems can automatically reverse earlier assertions based on new records, hence correcting earlier assertions.

Entity resolution systems can be to some degree or another imprecise. Sometimes entity resolution may resolve two entities into one when they are not one (called a false positive) or determine two entities are not the same when they are the same (called a false negative). And other times, entity resolution processes may determine two entities are quite alike, yet there simply is not enough evidence (available features) to determine with certainty that the entities are the same. This type of uncertainty might simply be referred to as a "maybe." For example, just because two records share a fairly rare name and have addresses in the same city, this may not cause an entity resolution engine (based on its configuration) to assert that these records are for the same people—nonetheless, it would almost certainly qualify as a "maybe".

Most entity resolution systems, one would expect, will assert some entities as same, other entities as not same, and then some entities will likely fall into the category of "maybe."

The greater the number of data sources and greater the number of records, the more the potential "maybes", and organizations ranging from banks to insurance companies find themselves overwhelmed if they have to use human capital to manually evaluate all the "maybes." Furthermore, organizations that make critical decisions (determination of credit worthiness, law enforcement investigations, etc.) based on entity resolution often feel compelled to not only evaluate the "maybes" but also the system generated assertions of same or not same. Unfortunately, there are typically not enough people in an organization to manually inspect and validate these computer generated decisions either.

Thus, there is a need for an improved entity resolution system capable of automatically addressing the "maybes" and validating assertions of same and not same in a more efficient, automated manner.

BRIEF SUMMARY

Provided are a method, computer program product, and system for receiving data comprising an entity having at least one feature; determining how the entity correlates with an existing entity, identifying an additional feature to increase confidence of the entity resolution, searching a data source for the additional feature to obtain an observation containing the additional feature, and performing the entity resolution using the at least one feature and the additional feature.

BRIEF DESCRIPTION OF THE SEVERAL VIEWS OF THE DRAWINGS

Referring now to the drawings in which like reference numbers represent corresponding parts throughout:

FIG. 4 illustrates sample data in a table in accordance with certain embodiments.

FIG. 6 illustrates a table of data sources in which to search for particular features in accordance with certain embodiments.

FIG. 7 illustrates a table used to determine what information is needed to perform searches of the data sources in accordance with certain embodiments.

FIG. 8 illustrates a table with cost and access technique information about each data source in accordance with certain embodiments.

FIG. 11 illustrates a table of known records in accordance with certain embodiments.

DETAILED DESCRIPTION

In the following description, reference is made to the accompanying drawings which form a part hereof and which illustrate several embodiments of the invention. It is understood that other embodiments may be utilized and structural and operational changes may be made without departing from the scope of the invention.

Figure 1:
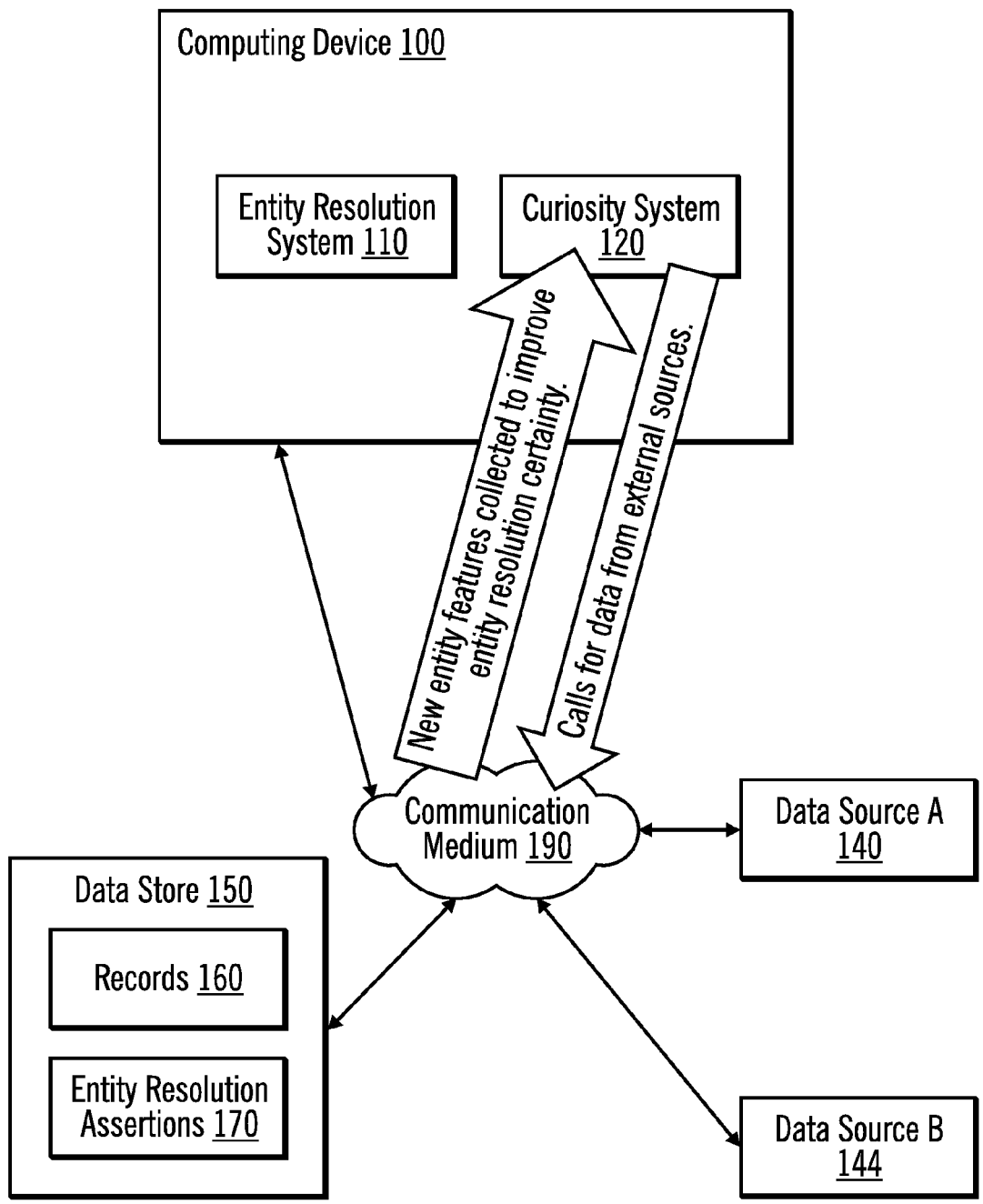
FIG. 1 illustrates a computing architecture in accordance with certain embodiments.

FIG. 1 illustrates a computing architecture in accordance with certain embodiments. A computing device 100 includes an entity resolution system 110 and a curiosity system 120. The computing device 100 is coupled to a data store 150 and multiple data sources, such as Data Source A 140 and Data Source B 144 via a communication medium 190 (e.g., an internal network or the Internet). The data sources 140, 144 may be external data sources. The data sources 140, 144 may represent data available at Internet sites. The data store 150 includes records 160 and entity resolution assertions 170 and may exist more local to the computing device 100.

The curiosity system 120 makes calls for data from external sources, such as Data Source A 140 and Data Source B 144, and the curiosity system 120 receives new entity features collected to improve entity resolution certainty. An entity is, for example, a person, place or thing. As a more detailed example, the entity may be a building (which may be a place and a thing), a car (which may be a thing and, when not moving, may identify a place), an object (e.g., a book), a protein, etc. The data sources 140, 144 may be, for example, sensors or collection systems that produce records about entities.

In the data store 150, there are records 160 coming from transactions (e.g., records being produced by sensors or collection systems). These records may have various features (e.g., name and address for a person). A record 160 representing a collection of records (sometimes one, sometimes more) may be conjoined from time to-time as entities are resolved. These conjoined (resolved) records 160 are entity resolution assertions 170. The way multiple records 160 are conjoined may involve these records 160 sharing a surrogate key (common unique entity identifier, e.g., incrementing serial number) that is assigned by the entity resolution system 110. Thus, each entity resolution assertion 170 is a record 160 or a set of conjoined records 160, and each such assertion is deemed a discrete entity.

The following Table A is an example of a conjoined record 160 that includes two records 160 (with record identifiers "1" and "2") for a resolved entity with an assigned surrogate key of "1":

TABLE A

| RECORD IDENTIFIER | ENTITY IDENTIFIER | ... |
|---|---|---|
| 1 | 1 | |
| 2 | 1 | |

In Table A, the ellipses represent that zero or more columns may be included to represent additional data (names, locations, dates, times, quantities, amounts, etc). The above Table A represents a simplified example of how the assertion is recorded in the data store 150. Records 160 are conjoined into resolved entities. Records 160 are assigned entity identifiers to indicate which records 160 are "members" (or conjoined into common entities).

In certain embodiments, despite previously existing records 160 and related historical assertions, the entity resolution system 110 uses newly learned features to reevaluate and reverse earlier entity resolution assertions 170 (i.e., to split a conjoined record 160) which is simply done by changing a record's assigned entity identifier.

Conjoined records 160 may also be referred to as entity resolved records 160. In certain embodiments, the conjoined records 160 are treated as a union, instead of being physically merged into one record 160. In certain alternative embodiments, the conjoined records 160 are physically merged into one record 160 (however, this may complicate the process of reversing earlier assertions). In certain embodiments, the term "conjoined" describes keeping records 160 intact and loosely attached, such that the entity resolution system 110 can later separate the records 160 should new records 160 warrant such a correction to a previous entity resolution assertion 170.

The data store 150 resides on a computing device, but the data store 150 may or may not reside on computing device 100. The data store 150 may be directly coupled via direct attached disk, Storage Attached Network (SAN), a network switch, Universal Serial Bus (USB), firewire, Inifiniband™ technology, or indirectly via Ethernet network, the Internet, etc. In some embodiments, the data store 150 may be distributed across two or more storage devices, such as a distributed relational database, cloud data storage system, etc.

In some embodiments, the data store 150 may be distributed across two or more computing devices, such as a distributed relational database, cloud data storage system, etc.

The entity resolution system 110 attempts to make entity resolution assertions 170. In certain embodiments, each of the entity resolution assertions 170 may have an associated confidence (e.g., highly probably, likely, certainly not or may be a score like 92).

In certain embodiments, confidence is determined based on how features of a newly received record 160 agree or disagree to the features of a known resolved entity 170. For example, if a received record 160 and a known entity 170 have the same name, address, and phone, then the likelihood these are the same entities may be high. In another embodiment, deterministic (rule based) evaluation and probabilistic (statistical frequencies) may be used in any combination to determine whether an entity resolution assertion 170 should or should not take place.

For example, the following may represent features and their confidence scores:

| Feature 1: | Feature 2: |
|---|---|
| 123 Main Street | 123 Main Street Suite 100 |
| Springfield, CA 98765 | Springfield, CA 98765 |
| Address confidence score: 90 | |
| Feature: 3 | Feature 4 |
| John Q Doe | John Quincy Doe |
| Full Name confidence score: 95 | |
| Given Name confidence score: 85 | |
| Surname confidence score: 100 | |

The entity resolution system 110 determines if there could be a consequence if the entity resolution is wrong. Herein, this is referred to as "something worth being curious about." How consequence is determined may be implemented in either a naive manner or a sophisticated manner. In a naïve manner, any entity resolution decision to match or not match with an entity flagged as critical (e.g., Billy the Kid or Chairman of the Board) may automatically be deemed consequential. In a more sophisticated implementation, a consequential decision may be determined by computed factors such as if these two people are the same, then the total transactions would exceed $10,000 and would be subject to mandatory reporting.

If the entity resolution is something worth being curious about (consequence threshold met), the curiosity engine is called, the curiosity system 120 determines what additional features may be needed to increase entity resolution certainty (one way or the other—confirming or denying). In various embodiments, the consequence threshold may have different values. For example, for watchlist monitoring, the consequence threshold may be 100%, in which case there is always curiosity to determine additional features. As another example, for advertising, the consequence threshold may be lower. The curiosity system 120 defines what kinds of features are needed, and the curiosity system 120 actively searches for them out in the world without the necessity of a human explicitly defining where and how to look (i.e., search).

Thus, the curiosity system 120 is an unguided curiosity service that searches for and fetches content. Then, the curiosity system 120 submits this content to the entity resolution system 110, driving up entity resolution accuracy rates, reducing human capital costs to deal with uncertainty, freeing up human capital to work on the toughest ambiguity issues.

The curiosity system 120 may learn what kinds of resources (internal systems or external systems, e.g., the Internet) are useful and in which circumstances. The curiosity system 120 may remember how to use these resources and discovers emerging resources over time. The curiosity system 120 may optimize when to search where by taking into account such factors as: a) how reliable the source seems to be (e.g., data quality, recency of information, etc.), b) the responsiveness of the interaction (200 millisecond latency versus 2 minutes), c) the cost per record (free versus $5), and d) the consequences and/or ramifications of the entity resolution assertion 170 (e.g., is it worth spending $100.00 to ensure this decision is correct?).

The curiosity system 120 has an ability to search various on-line resources for this data (e.g., search the Internet at-large for the useful data). The curiosity system 120 may learn what kind of data is where and may optimize for efficiency and cost when needing similar features in similar circumstances/scenarios in the future. For example, it may be learned that a popular social media website is a great source to learn middle names.

Figure 2:
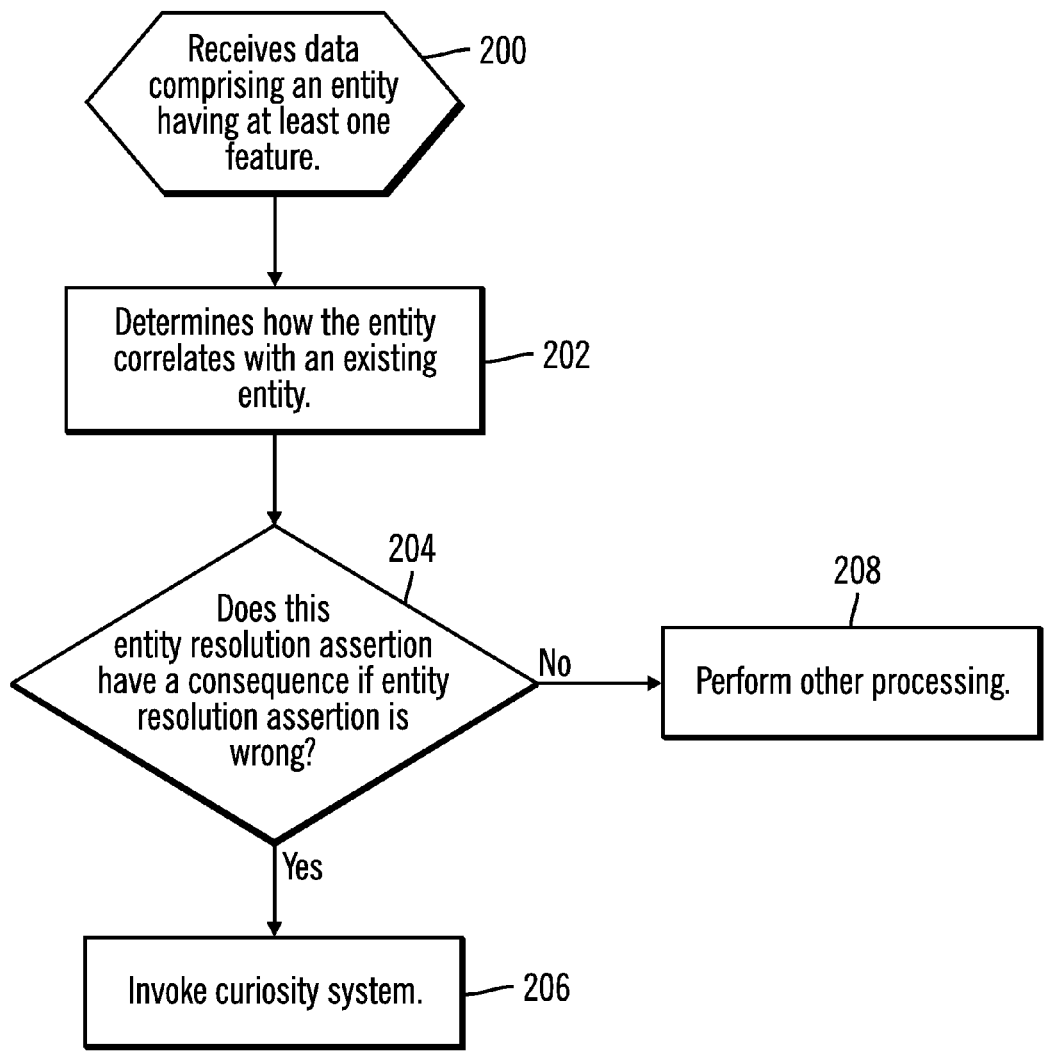
FIG. 2 illustrates, in a flow diagram, logic performed by an entity resolution system to determine when to invoke the curiosity system in accordance with certain embodiments.

FIG. 2 illustrates, in a flow diagram, logic performed by the entity resolution system 110 to determine when to invoke the curiosity system 120 in accordance with certain embodiments. Control begins in block 200 with the entity resolution system 110 receiving data comprising an entity having at least one feature. In block 202, the entity resolution system 110 determines how the entity correlates with an existing entity. For example, the entity resolution system 110 determines that the entity resolution assertion 170 is a "maybe" (i.e., the initial entity resolution assertion 170 necessitates deeper inspection). In block 204, the entity resolution system 110 determines whether this entity resolution assertion 170 has a consequence if wrong. For example, the entity resolution system 110 determines whether this entity resolution assertion 170 is worth pursuing based on whether, if the entity resolution assertion 170 were true, it would it matter. As another example, if the entity resolution assertion 170 were a "maybe", it may be desirable to obtain additional features to promote the "maybe" to true. As a further example, the determination of block 204 may be based on: 1) whether the entity is flagged as of interest (e.g., the entity is a criminal), 2) whether a resolution may trigger an important event (e.g., a vendor is an employee who is violating a business controls rule) and/or 3) whether some other threshold is reached (e.g., if the entity resolution assertion 170 occurred, there would be an alert discovered via two degrees of separation). If this "maybe" is worth pursuing, processing continues to block 206, otherwise, processing continues to block 208. In block 206, the entity resolution system 110 invokes the curiosity system 120. In block 208, the entity resolution system 110 performs other processing.

Figure 3:
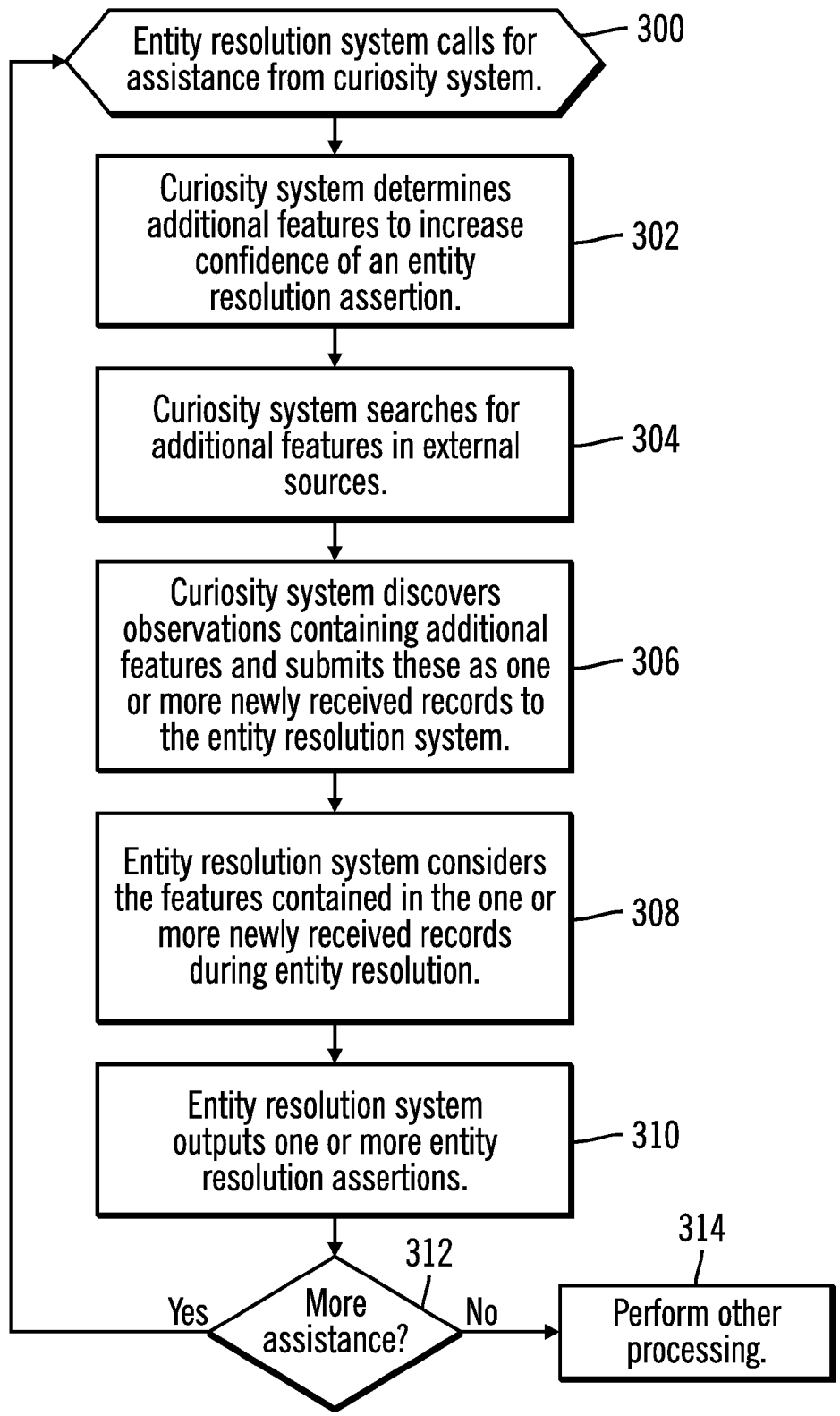
FIG. 3 illustrates, in a flow diagram, logic performed to generate one or more entity resolution assertions in accordance with certain embodiments.

FIG. 3 illustrates, in a flow diagram, logic performed to generate one or more entity resolution assertions 170 in accordance with certain embodiments. Control begins in block 300 with the entity resolution system 110 calling for assistance from the curiosity system 120. In block 302, the curiosity system 120 determines additional features to increase the confidence of an entity resolution assertion 170. In various embodiments, additional features may also be described as needed features, beneficial features and/or missing features. In block 304, the curiosity system 120 searches for the additional features in external sources (e.g., an Internet search engine, a data aggregator of public and commercial records, etc.). The external sources may be previously known sources or newly discovered sources. In block 306, the curiosity system 120 discovers observations containing additional features and submits these as one or more newly received records 160 to the entity resolution system 110. In block 308, the entity resolution system 110 considers the features contained in the one or more newly received records 160 during entity resolution. For example, with the features contained in the one or more newly received records, if before a record 160 was considered a "maybe", now this previous assertion may be changed to "yes"—i.e., resolved. In block 310, the entity resolution assertion 170 system outputs one or more entity resolution assertions 170. In block 312, the entity resolution assertion 170 system determines whether more assistance would be useful. If so, processing continues to block 300, otherwise, processing continues to block 314. In block 314, the entity resolution system 110 performs other processing.

In certain embodiments, the entity resolution system 110 determines a confidence score for an entity resolution assertion 170. The confidence score indicates whether the entity resolution is a "yes", "maybe" or "no". A "yes" may be described as "certainly true", and a "no" may be described as "certainly not true". A "maybe" may also be described as an uncertain answer. If the entity resolution system 110 produces an "uncertain" answer, the entity resolution system 110 invokes the curiosity system 120. Moreover, if the entity resolution system 110 produces a "certainly true", there may still be cases in which added caution is vital, e.g., someone is going to be fired or promoted over this entity resolution assertion 170. In such selected cases, the curiosity system 120 may be triggered to independently test this certainty by looking for contradictory features (e.g., looking for features to make sure there is not a junior/senior oversight). In addition, if the entity resolution system 110 produces a "certainly not true", there may be cases in which added caution is vital, e.g., someone is going to be fired or promoted over this entity resolution assertion 170. In such selected cases, the curiosity system 120 may be triggered to independently test this certainty. In short, if the consequence of a decision is important, the entity resolution system 110 invokes the curiosity system 120.

FIG. 4 illustrates sample data in a table 400 in accordance with certain embodiments. Table 400 shows data for a job applicant named Mark Smith with a date of birth of Jun. 22, 1964 and an arrest record 160 for Mark K. Smith with a date of birth of Jun. 22, 1964. However, name and date of birth may not be good enough to be sure that the records 160 for Mark Smith and Mark K. Smith are for the same person. For example, one may not want to deny a job applicant the right to employment based on this inconclusive arrest candidate, taking for example a match score of 78, which is under the 92 threshold for matching. In this case, traditional processes would require a human to "do some research" to determine whether the records 160 for Mark Smith and Mark K. Smith are for the same person. However, with embodiments, the curiosity system 120 obtains additional features to determine whether the records 160 for Mark Smith and Mark K. Smith are for the same person.

With reference to the example shown in table 400, a job applicant may be denied employment if this job applicant was treated as a felon when the person was not a felon. Or, if the records 160 were treated as "not a match" when they were for the same person, then a felon would be inadvertently hired (e.g., against company policy).

For the sake of the example of table 400, assume there is a hiring consequence if the entity resolution assertion 170 was confirmed, hence, this is a condition in which it is worth invoking the curiosity system 120.

Figure 5:
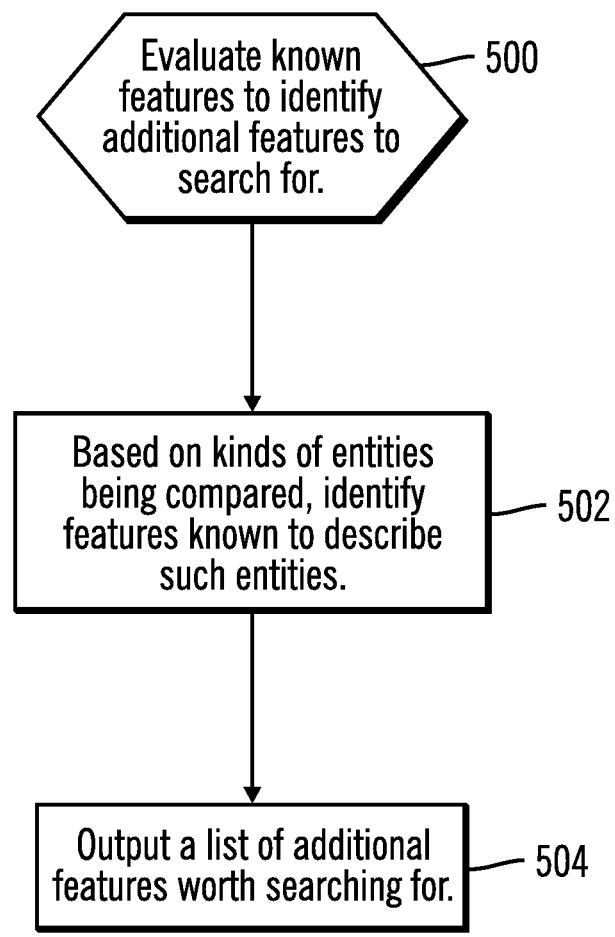
FIG. 5 illustrates, in a flow diagram, logic performed by a curiosity system for determining what features are useful to resolve the ambiguity in accordance with certain embodiments.

FIG. 5 illustrates, in a flow diagram, logic performed by the curiosity system 120 for determining what features are needed to resolve the ambiguity in accordance with certain embodiments. Control begins in block 500 with the curiosity system 120 evaluating the known features to identify additional features to search for. For example, with reference to the example of table 400, the curiosity system 120 evaluates the known features to identify additional features that are worth learning. In this example, the curiosity system 120 may look at the features of the job applicant and the felon in table 400 and determine that the following features may increase scoring confidence:
1. What is the job applicant's middle initial or middle name?
2. Has the job applicant ever lived on Main Street in Las Vegas?
3. What is the felon's Social Security Number (SSN)?

Answers to these simple questions may clear up the ambiguity. However, the curiosity system 120 also attempts to identify what else might be necessary to clear this up and what other feature expansion on one or both sides of this equation would bring more certainty to a decision. For this example, the curiosity system 120 may determine that the following features may increase scoring confidence:
1. Has either person used an alias (e.g., the job applicant is also known as "Kenny M Smith")?
2. Does the address history of the job applicant intersect (e.g., overlap) the address history of the felon (e.g., despite the fact the job applicant record 160 is missing the Main Street address, the two nonetheless, may share years of common address history)?
3. Are there other identifiers discoverable that can raise confidence (e.g., can the Driver's License (D/L) number of each person be learned and compared to see if the job application and the felon have the same D/L number)?

This process involves knowing what kinds of entities are being compared and knowing what features are known to describe such entities. In the case of people, the list of knowable features might include: names, addresses, dates of birth, places of birth, federal identifiers (e.g., SSN), state identifiers (e.g., D/L), place of birth, height, weight, mother, father, etc. Thus, in block 502, the curiosity system 120, based on kinds of entities being compared, identifies features known to describe such entities In block 504, the curiosity system 120 outputs a list of additional features worth looking for (while remembering what kind of entity needs which features—e.g., Felon needs an SSN).

The curiosity system 120 prioritizes what to search for. For example, learning the SSN of the felon is likely to provide more certainty than learning the middle initial of the job applicant. This means SSN is a higher priority. With reference to the example of table 400, the curiosity system 120 may rank features as follows:
1. What is the felon's SSN?
2. Has the job applicant ever lived on Main Street in Las Vegas?
3. What is the job applicant's middle initial or middle name?

These are values needed only for either the job application or the felon. These values may be helpful, but would require more resources, and information would be needed from each side.

The curiosity system 120 may also rank additional features as follows:
1. Are there other identifiers discoverable that can raise confidence (e.g., can the Driver's License (D/L) number of each person be learned and compared to see if the job application and the felon have the same D/L number)?
2. Does the address history of the job applicant intersect (e.g., overlap) the address history of the felon?
3. Has either person used an alias (e.g., the job applicant is also known as "Kenny M Smith")?

The curiosity system 120 prioritizes the features based on degree of difficulty and cost to acquire the data. For example, the curiosity system 120 knows or, over time, comes to learn, that Social Security Numbers (SSNs) are not freely available on the Internet and are not likely to be found via a search engine on the Internet. On the other hand, the curiosity system 120 knows that address histories are readily available, especially if they are historical addresses (older data often being cheaper than current data).

Embodiments use various optimization techniques, and there are many techniques for evaluating price and availability for best route to acquire data.

In certain embodiments, the curiosity system 120 uses a series of tables of accumulated knowledge of what to search for and where. FIG. 6 illustrates a table 600 of data sources in which to search for particular features in accordance with certain embodiments. In certain embodiments, the data sources include Internet search sites. FIG. 7 illustrates a table 700 used to determine what information is needed to perform searches of the data sources in accordance with certain embodiments. FIG. 8 illustrates a table 800 with cost and access technique information about each data source in accordance with certain embodiments. An access technique may also be described as an Interface type. The curiosity system 120 uses the information in table 800 to perform prioritization.

Figure 9:
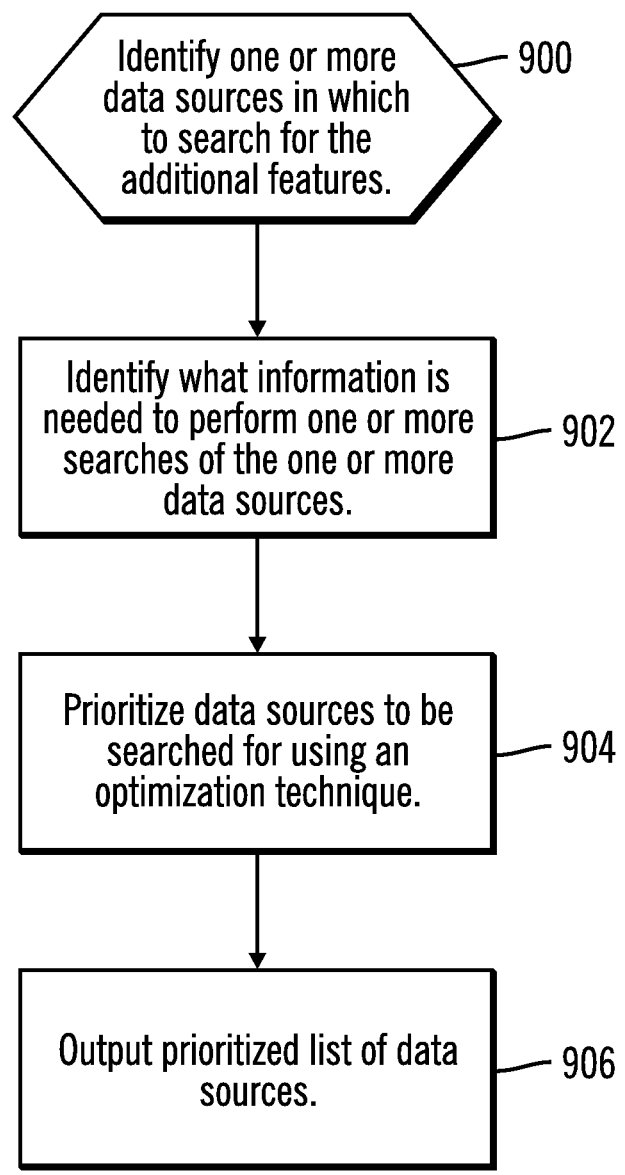
FIG. 9 illustrates, in a flow diagram, logic performed by the curiosity system for prioritizing what to search for first in accordance with certain embodiments.

FIG. 9 illustrates, in a flow diagram, logic performed by the curiosity system 120 for prioritizing what to search for first in accordance with certain embodiments. Control begins in block 900 with the curiosity system 120 identifying one or more data sources in which to search for the additional features. In certain embodiments, the curiosity system 120 identifies data sources (e.g., Internet search sites) using table 600. For example, if the feature needed is address, table 600 indicates that Data Source 1, Data Source 2, Data Source 3, and Data Source 4 may be used. In block 902, the curiosity system 120 identifies what information is needed to perform one or more searches of the one or more data sources. In certain embodiments, the curiosity system 120 identifies information needed to search a data source using table 700. For example, if the curiosity system 120 is attempting to locate the address feature using Data Source 1, then, the curiosity system 120 needs to have a name or phone number to be able to look up the address. In block 904, the curiosity system 120 prioritizes the data sources that are to be searched using an optimization technique. In certain embodiments, the curiosity system 120 uses table 800 to obtain information, for each data source, on the technique of the search (e.g., "auto" being a source found via Google™ query (i.e., search) where entity extraction of key features may be automated versus "Interface" meaning a specially coded interface such as a paid for subscription service using a LexisNexis® Application Programming Interface (API)), the cost of the search, and maybe the accuracy of the source. In certain embodiments, the curiosity system 120 performs prioritization based on such factors as: a) how reliable the data source seems to be (quality, timeliness, etc.), b) the responsiveness of the interaction (latency), c) the cost per record, and d) the consequences or ramifications of the entity resolution assertion 170 (worth spending $100 to ensure this decision is correct). For example, with reference to the consequences and cost, if the consequence of an entity resolution assertion 170 that a person is a felon could lead to the person losing a job, then, more money may be spent to access a very accurate data source. On the other hand, if the consequence of an entity resolution assertion 170 is less significant, then, a data source that is cheaper and less accurate may be used.

In block 906, the curiosity system 120 outputs a prioritized (i.e., ranked) list of data sources. For example, the curiosity system 120 may output the following:

1. Has the job applicant ever lived on Main Street in Las Vegas?
   Check Data Source 2 using name and year of birth.
2. Does the address history of the job applicant intersect (e.g., overlap) the address history of the felon?
   Check Federal Data Source using name and Date of Birth (DOB), name and address, address, and name and state (is this four searches?).
   Check Data Source 2 using name and year of birth.

Figure 10:
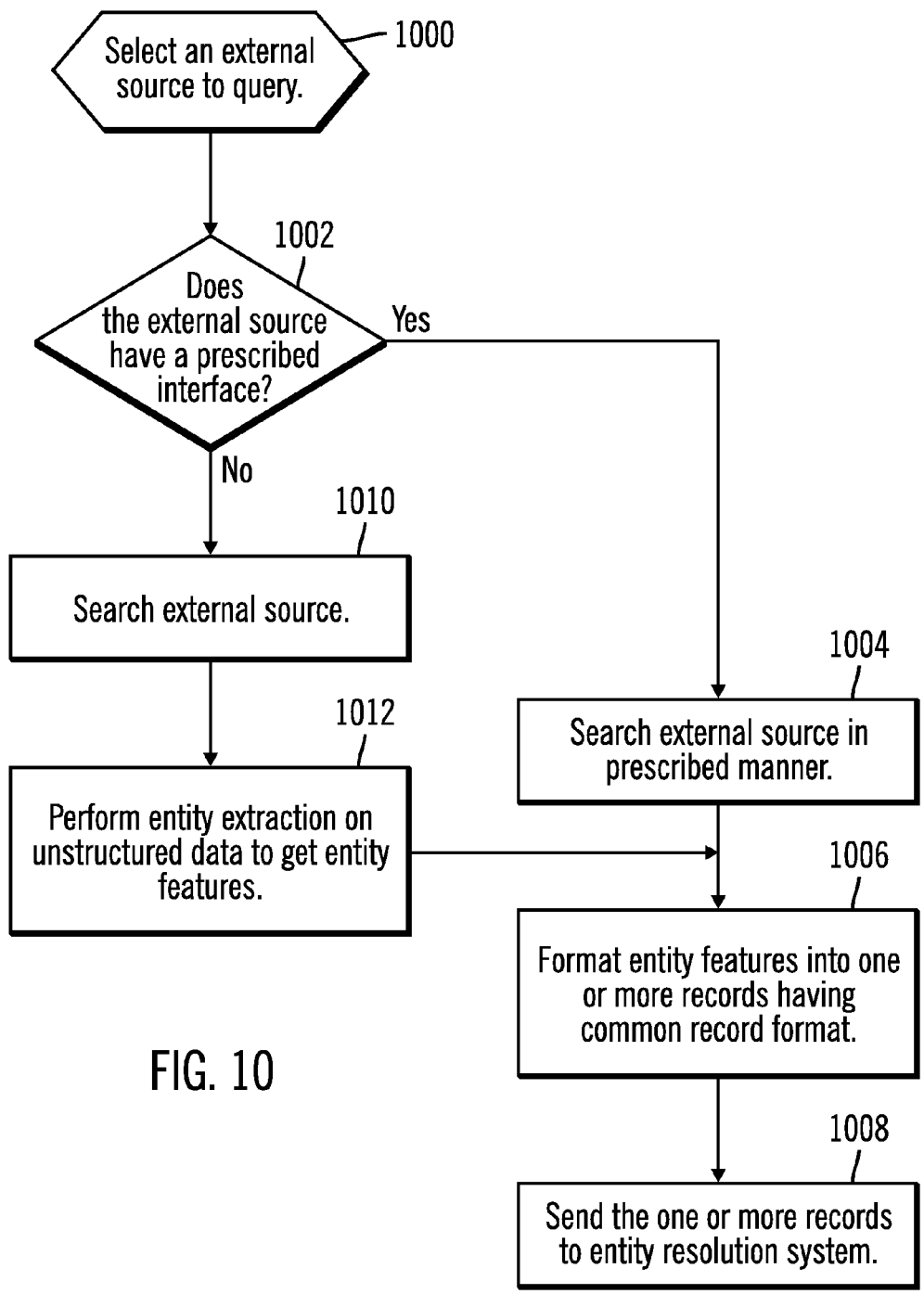
FIG. 10 illustrates, in a flow diagram, logic performed by the curiosity system for selecting where to search for missing features, extracting entities and features from the search results in a manner consistent with the type of system, and supplying the entity resolution system this new information in accordance with certain embodiments.

FIG. 10 illustrates, in a flow diagram, logic performed by the curiosity system 120 for selecting where to search for missing features, extracting entities and features from the search results in a manner consistent with the type of system, and supplying the entity resolution system 110 this new information in accordance with certain embodiments. Control begins at block 1000 with the curiosity system 120 selecting an external source to query. The external data source may have a prescribed (i.e., standard interface) or may be a self-discovered (i.e., automatic) data source. That is, using the prioritized features (which are curiosity directives), the curiosity system 120 uses either a prescribed or self-discovered interface for the external source. Prescribed interfaces may be described as hand-coded and handled on a case-by-case basis. Self-discovered (automatic) data sources may require entity extraction and advanced pre-processing to locate the right data item on any given page. In block 1002, the curiosity system 120 determines whether the external data source has a prescribed interface. If so, processing continues to block 1004, otherwise, processing continues to block 1010.

In block 1004, the curiosity system 120 searches the external source in a prescribed manner. In block 1006, the curiosity system 120 formats the entity features into one or more records 160 having a common record format. For example, the curiosity system 120 places the one or more records 160 into a standard record format upon the same structure and flow as data coming via enterprise records. In another embodiment, the newly learned features are not passed through the same structure and flow, rather they are passed natively and directly into the entity resolution engine. In block 1008, the curiosity system sends the one or more records 160 to the entity resolution system 110.

In block 1010, the curiosity system 120 searches the external source. In block 1012, the curiosity system 120 performs entity extraction on unstructured data to get entity features. From block 1012, processing continues to block 1006.

Thus, the curiosity system 120 may draw on entity extraction processing to extract and classify features (e.g., from unstructured text, video, etc.).

The entity resolution system 110 attributes the one or more records 160 to the source (e.g., Data Source 2) and uses the data to re-evaluate the previous ambiguous data. Due to the rules of sequence neutrality, the late arriving data is used to change the confidence of the earlier records 160.

Thus, an interfaced system has a prescribed set of techniques (e.g., method of a class) to return results. Conversely, using a search engine (e.g., the Google™ search engine) might stumble upon an unfamiliar unstructured data source that would require some more precarious entity extraction to find the features and submit them to the entity resolution system 110.

In certain embodiments, the first time the curiosity system 120 is run, there are no previously known (pre-registered in tables 6, 7, and 8) data sources to find data. In alternative embodiments, the first time the curiosity system 120 is run, there are some known data sources to find data. Regardless, the curiosity system 120 discovers additional data sources (e.g., for obtaining addresses for a person to answer the question: Did Mark the job applicant ever live on Main Street in Las Vegas?).

In certain embodiments, the curiosity system 120 discovers (i.e., learns) new data sources. For example, taking a sample of job applicant records 160 (e.g., 10 records 160) already on file that already contain addresses, the curiosity system 120 issues queries, for example to the Google™ search engine, with the known addresses and receives a first result list FIG. 11 illustrates a table 1100 of known records 160 in accordance with certain embodiments. For this example, the curiosity system 120 determines from reviewing the first result list that 8 out of 10 queries were answered from a single new data source (e.g., a web site), with the new data source containing the known addresses. In this manner, the curiosity system 120 discovers that the new data source is a good data source for address information.

In certain embodiments, the curiosity system 120 inverts the process. For example, the curiosity system 120 issues queries with the name and year of birth for the 8 out of 10 records 160 on the first result list and receives a second result list. For this example, 7 out of the 8 queries came back with data sources (e.g., web sites) found in the first result list. That is, the curiosity system 120 may filter the any number of result lists (e.g., the first and second result lists) to identify the data sources found on both lists. Then, the curiosity system 120 may find that the data sources found on both lists are candidate data sources for future discovery of address data when only name and year of birth are known.

Thus, using well understood machine learning, the curiosity system 120 (without human intervention) determines the structure and where to search inside of each one of these data sources (e.g., Internet sites) because the inputs (search) are known (e.g., used to form the Google™ query), and the features needed for extraction (values already known a priori and, hence, confirming this data source contains co-referenced information i.e., the name address and DOB are known, then searching name and DOB, the curiosity system 120 checks if the results contain the expected address) are also known and can be found. In this way the structure of each unique data source can be gleaned and remembered and used thereafter to address real curiosity requests.

Figure 12:
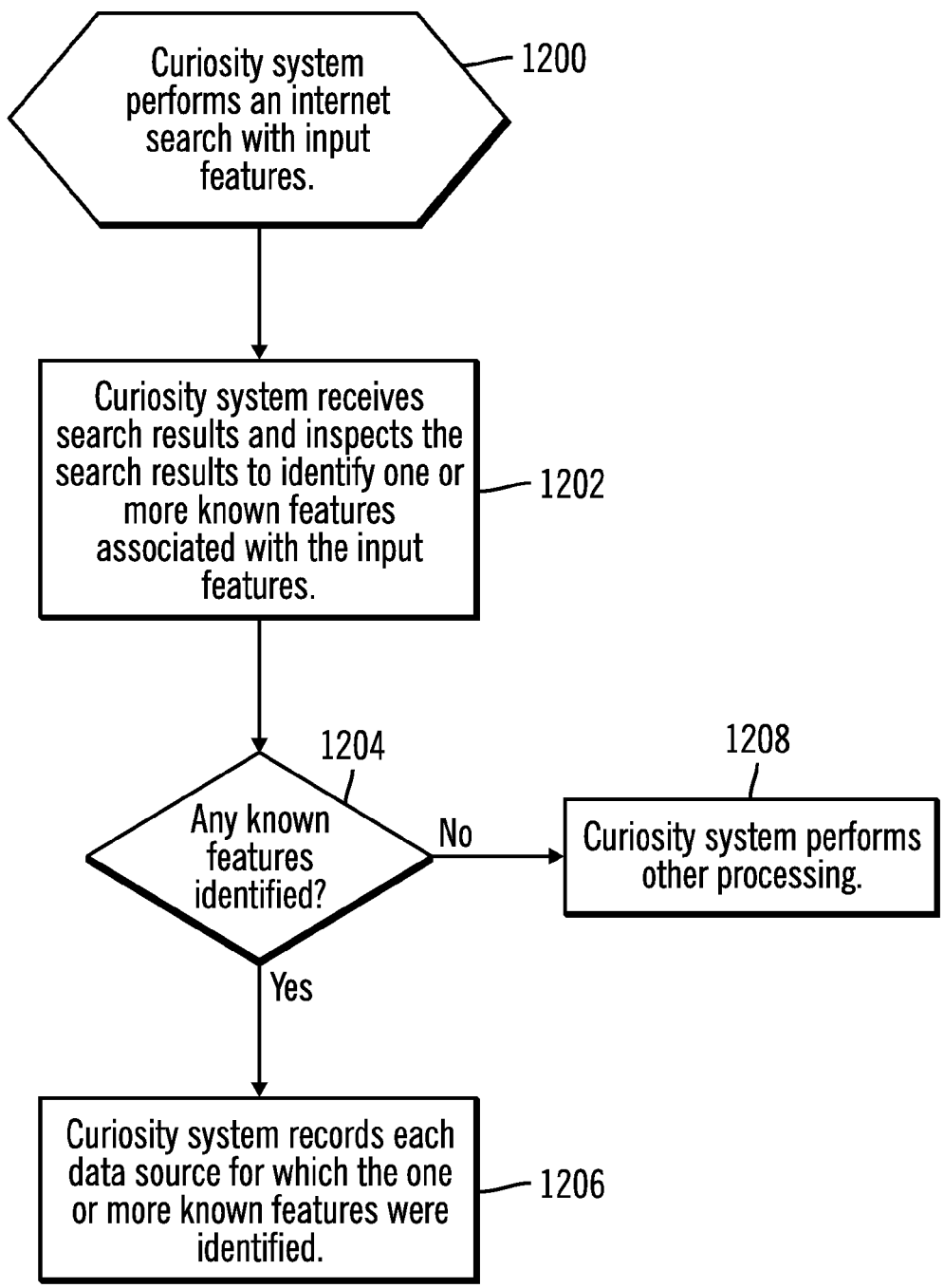
FIG. 12 illustrates, in a flow diagram, logic performed by curiosity system for discovering new places to search in accordance with certain embodiments

FIG. 12 illustrates, in a flow diagram, logic performed by the curiosity system 120 for discovering new places to search in accordance with certain embodiments. Control begins at block 1200 with the curiosity system 120 performing an internet search with input features (e.g., a search for Name and DOB). In block 1202, the curiosity system 120 receives search results (e.g., the top 20 result pages), and the curiosity system 120 inspects the search results to identify one or more known features associated with the input features (e.g., determines whether the expected address for the subject (having the input Name and DOB) is present). In block 1204, the curiosity system 120 determines whether any known features were identified. If so, processing continues to block 1206, otherwise, processing continues to block 408. In block 1206, the curiosity system 120 records (i.e., stores) each data source for which the one or more known features were identified. In block 1208, the curiosity system 120 performs other processing. Thus, if one or more known features are identified, then, the curiosity system 120 has discovered a viable source worth remembering. In certain embodiments, the more often the curiosity system 120 discovers the same data source, the better the data source.

In certain embodiments, the curiosity system 120 may be trying to see if the two people are the same, hence, the search would include both names ("Tim Kovak" and "Timothy Kovack"). The Google™ search engine might return a page about one person of same name or may return multiple pages whereby Tim is a stock broker and Timothy is a ship captain.

Thus, rather than load all the data of multiple data sources available (which is cost prohibitive because, for example, some data requires payment for record-by-record), embodiments automatically decide which external data sources should be queried for particular features. Also, although some data sources are free, a free data source may be too large to load in a reasonable period of time. Thus, automatically determining which external data sources to access is cost effective.

Embodiments provide a technique for determining what data is missing that would matter. Embodiments also provide a technique for choosing an external data source (in company or outside company) from which to obtain data.

Additional Embodiment Details

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, solid state memory, magnetic tape or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The code implementing the described operations may further be implemented in hardware logic or circuitry (e.g., an integrated circuit chip, Programmable Gate Array (PGA), Application Specific Integrated Circuit (ASIC), etc.

Figure 13:
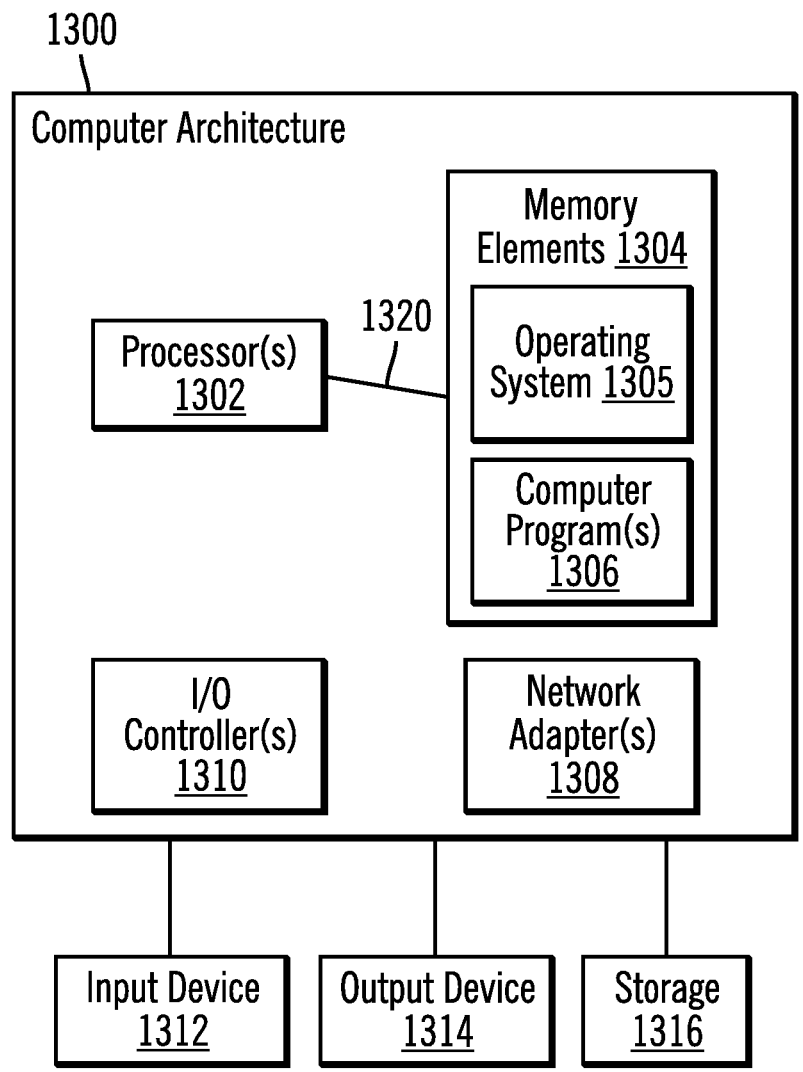
FIG. 13 illustrates a computer architecture that may be used in accordance with certain embodiments.

FIG. 13 illustrates a computer architecture 1300 that may be used in accordance with certain embodiments. Computing device 100 may implement computer architecture 1300. The computer architecture 1300 is suitable for storing and/or executing program code and includes at least one processor 1302 coupled directly or indirectly to memory elements 1304 through a system bus 1320. The memory elements 1304 may include local memory employed during actual execution of the program code, bulk storage, and cache memories which provide temporary storage of at least some program code in order to reduce the number of times code must be retrieved from bulk storage during execution. The memory elements 1304 include an operating system 1305 and one or more computer programs 1306.

Input/Output (I/O) devices 1312, 1314 (including but not limited to keyboards, displays, pointing devices, etc.) may be coupled to the system either directly or through intervening I/O controllers 1310.

Network adapters 1308 may also be coupled to the system to enable the data processing system to become coupled to other data processing systems or remote printers or storage devices through intervening private or public networks. Modems, cable modem and Ethernet cards are just a few of the currently available types of network adapters 1308.

The computer architecture 1300 may be coupled to storage 1316 (e.g., a non-volatile storage area, such as magnetic disk drives, optical disk drives, a tape drive, etc.). The storage 1316 may comprise an internal storage device or an attached or network accessible storage. Computer programs 1306 in storage 1316 may be loaded into the memory elements 1304 and executed by a processor 1302 in a manner known in the art.

The computer architecture 1300 may include fewer components than illustrated, additional components not illustrated herein, or some combination of the components illustrated and additional components. The computer architecture 1300 may comprise any computing device known in the art, such as a mainframe, server, personal computer, workstation, laptop, handheld computer, telephony device, network appliance, virtualization device, storage controller, etc.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of embodiments of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The foregoing description of embodiments of the invention has been presented for the purposes of illustration and description. It is not intended to be exhaustive or to limit the embodiments to the precise form disclosed. Many modifications and variations are possible in light of the above teaching. It is intended that the scope of the embodiments be limited not by this detailed description, but rather by the claims appended hereto. The above specification, examples and data provide a complete description of the manufacture and use of the composition of the embodiments. Since many embodiments may be made without departing from the spirit and scope of the embodiments, the embodiments reside in the claims hereinafter appended or any subsequently-filed claims, and their equivalents.

The invention claimed is:

1. A method, comprising:
receiving, using a processor of a computer, data comprising an entity having a feature;
determining how the entity correlates with an existing entity;
generating an entity resolution assertion having a confidence score;
determining that there is a consequence based on the confidence score and the entity resolution assertion being wrong;
identifying an additional feature for the entity to increase the confidence score of the entity resolution assertion, wherein the additional feature is not received with the entity;
searching an external data source for the additional feature to obtain an observation containing the additional feature; and
performing entity resolution using the at least one feature and the additional feature.

2. The method of claim 1, further comprising:
evaluating how the received entity correlates with the existing entity to determine whether a consequence threshold is met; and
in response to the consequence threshold being met, identifying the additional feature.

3. The method of claim 1, further comprising:
selecting one or more data sources in which to search for the additional feature;
prioritizing the one or more data sources; and
selecting the external data source from the prioritized one or more data sources.

4. The method of claim 1, wherein the additional feature enables two records to be resolved to one entity or multiple records in one entity to be split.

5. The method of claim 1, further comprising:
discovering a new data source in which to search for the additional feature, wherein the external data source is the discovered, new data source; and
recording the new data source that has been discovered.

6. The method of claim 1, further comprising:
based on a kind of entity being compared, identifying one or more additional features known to describe the kind of entity; and
outputting the one or more additional features.

7. The method of claim 1, wherein identifying the additional feature further comprises:
identifying multiple additional features;
prioritizing the multiple additional features to be searched based on cost and accuracy; and
selecting the additional feature from the prioritized additional features.

8. The method of claim 1, wherein the data source is one of prescribed and self discovered.

9. A computer system, comprising:
a processor; and
a storage device coupled to the processor, wherein the storage device stores a program, and wherein the processor is configured to execute the program to perform operations, the operations comprising:
receiving data comprising an entity having a feature;
determining how the entity correlates with an existing entity;
generating an entity resolution assertion having a confidence score;
determining that there is a consequence based on the confidence score and the entity resolution assertion being wrong; and
identifying an additional feature for the entity to increase the confidence score of the entity resolution assertion, wherein the additional feature is not received with the entity;
searching an external data source for the additional feature to obtain an observation containing the additional feature; and
performing entity resolution using the at least one feature and the additional feature.

10. The computer system of claim 9, wherein the operations further comprise:
evaluating how the received entity correlates with the existing entity to determine whether a consequence threshold is met; and
in response to the consequence threshold being met, identifying the additional feature.

11. The computer system of claim 9, wherein the operations further comprise:
selecting one or more data sources in which to search for the additional feature;
prioritizing the one or more data sources; and
selecting the external data source from the prioritized one or more data sources.

12. The computer system of claim 9, wherein the additional feature enables two records to be resolved to one entity or multiple records in one entity to be split.

13. The computer system of claim 9, wherein the operations further comprise:
discovering a new data source in which to search for the additional feature, wherein the external data source is the discovered, new data source; and
recording the one new data source that has been discovered.

14. The computer system of claim 9, wherein the operations further comprise:
based on a kind of entity being compared, identifying one or more additional features known to describe the kind of entity; and
outputting the one or more additional features.

15. The computer system of claim 9, wherein the operations for identifying the additional feature further comprise:
identifying multiple additional features;
prioritizing the multiple additional features to be searched based on cost and accuracy; and
selecting the additional feature from the prioritized additional features.

16. The computer system of claim 15, wherein the data source is one of prescribed and self discovered.

17. A computer program product comprising a computer readable storage device including a computer readable program, wherein the computer readable program when executed by a processor on a computer cause the computer to:
receive data comprising an entity having a feature;
determine how the entity correlates with an existing entity;
generate an entity resolution assertion having a confidence score;
determine that there is a consequence based on the confidence score and the entity resolution assertion being wrong;

identify an additional feature for the entity to increase the confidence score of an entity resolution, wherein the additional feature is not received with the entity;

search an external data source for the additional feature to obtain an observation containing the additional feature; and perform entity resolution using the at least one feature and the additional feature.

18. The computer program product of claim 17, wherein the computer readable program when executed by the processor on the computer cause the computer to:

evaluate how the received entity correlates with the existing entity to determine whether a consequence threshold is met; and in response to the consequence threshold being met, identifying the additional feature.

19. The computer program product of claim 17, wherein the computer readable program when executed by the processor on the computer cause the computer to:

select one or more data sources in which to search for the additional features;

prioritize the one or more data sources; and select the external data source from the prioritized one or more data sources.

20. The computer program product of claim 17, wherein the additional feature enables two records to be resolved to one entity or multiple records in one entity to be split.

21. The computer program product of claim 17, wherein the computer readable program when executed by the processor on the computer cause the computer to:

discover a new data source in which to search for the additional feature, wherein the external data source is the discovered, new data source; and record the new data source that has been discovered.

22. The computer program product of claim 17, wherein the computer readable program when executed by the processor on the computer cause the computer to:

based on a kind of entity being compared, identifying one or more additional features known to describe the kind of entity; and outputting the one or more additional features.

23. The computer program product of claim 17, wherein, when identifying the additional feature, the computer readable program when executed by the processor on the computer cause the computer to:

identify multiple additional features;

prioritize the multiple additional features to be searched based on cost and accuracy; and select the additional feature from the prioritized additional features.

24. The computer program product of claim 23, wherein the data source is one of prescribed and self discovered.

* * * * *